(12) United States Patent
Shi (10) Patent No.: US 11,391,973 B2
(45) Date of Patent: Jul. 19, 2022

(54) DISPLAY APPARATUS AND, CONTROL DEVICE, ADSORPTION EQUIPMENT AND CONTROL METHOD THEREOF

(71) Applicants: K-TRONICS (SU ZHOU) TECHNOLOGY CO., LTD., Jiangsu (CN); BOE TECHNOLOGY GROUP CO., LTD., Beijing (CN)

(72) Inventor: Rongrong Shi, Beijing (CN)

(73) Assignees: K-TRONICS (SU ZHOU) TECHNOLOGY CO., LTD., Suzhou (CN); BOE TECHNOLOGY GROUP CO., LTD., Beijing (CN)

(*) Notice: Subject to any disclaimer, the term of this patent is extended or adjusted under 35 U.S.C. 154(b) by 700 days.

(21) Appl. No.: 16/328,217

(22) PCT Filed: Jul. 20, 2018

(86) PCT No.: PCT/CN2018/096497
§ 371 (c)(1),
(2) Date: Feb. 25, 2019

(87) PCT Pub. No.: WO2019/056847
PCT Pub. Date: Mar. 28, 2019

(65) Prior Publication Data
US 2021/0356799 A1    Nov. 18, 2021

(30) Foreign Application Priority Data

Sep. 21, 2017  (CN) .......................... 201710861030.5

(51) Int. Cl.
*G02F 1/1333*   (2006.01)
*F16B 1/00*     (2006.01)
(Continued)

(52) U.S. Cl.
CPC ...... *G02F 1/133308* (2013.01); *F16B 1/0057* (2013.01); *G02F 1/1336* (2013.01);
(Continued)

(58) Field of Classification Search
CPC ............ F16B 1/0057; G02F 1/133308; G02F 1/1336; H01F 7/064; H01F 7/20
See application file for complete search history.

(56) References Cited

U.S. PATENT DOCUMENTS

| 2010/0120320 A1* | 5/2010 | Kim .................. G02F 1/133308 |
| | | 445/66 |
| 2010/0185048 A1* | 7/2010 | Lonky ..................... A61M 1/08 |
| | | 600/37 |

(Continued)

FOREIGN PATENT DOCUMENTS

| CN | 103676241 A | 3/2014 |
| CN | 104317076 A | 1/2015 |

(Continued)

OTHER PUBLICATIONS

English Machine Translation of CN 103676241B provided by ESPACENET (Year: 2014).*

(Continued)

*Primary Examiner* — Zheng Song
(74) *Attorney, Agent, or Firm* — Kinney & Lange, P.A.

(57) ABSTRACT

In an embodiment, a display apparatus includes: a backlight module; a housing having a cavity for receiving the backlight module therein; adsorption device mounted on the housing and configured for removably adsorbing the backlight module on the housing; and a controller configured for controlling the adsorption device to switch between a turn-on state in which the adsorption device generates an adsorption force to adsorb the backlight module to the housing and a turn-off state in which the adsorption device stops the adsorption to remove backlight module from the housing.

15 Claims, 3 Drawing Sheets

(51) Int. Cl.
*G02F 1/13357* (2006.01)
*H01F 7/20* (2006.01)
*H01F 7/06* (2006.01)

(52) U.S. Cl.
CPC ........... *H01F 7/20* (2013.01); *G02F 2201/46* (2013.01); *H01F 7/064* (2013.01)

(56) References Cited

U.S. PATENT DOCUMENTS

| | | | |
|---|---|---|---|
| 2014/0077698 A1* | 3/2014 | Lee | H05B 45/20 |
| | | | 315/51 |
| 2016/0018587 A1* | 1/2016 | Koraishy | G02B 6/0065 |
| | | | 156/708 |
| 2017/0205571 A1* | 7/2017 | Kim | G02B 6/0088 |
| 2018/0052354 A1* | 2/2018 | Li | H01F 7/0252 |
| 2019/0349685 A1* | 11/2019 | Choi | G02F 1/133608 |
| 2020/0041832 A1* | 2/2020 | Hsu | G02F 1/133308 |

FOREIGN PATENT DOCUMENTS

| | | | | |
|---|---|---|---|---|
| CN | 107450207 A | | 12/2017 | |
| CN | 110570766 | * | 12/2019 | ............... G09F 9/30 |
| JP | 216038436 A | | 3/2016 | |

OTHER PUBLICATIONS

International Search Report and English Translation of Box V of the Written Opinion dated Sep. 27, 2018, received for corresponding PCT Application No. PCT/CN2018/096497.

* cited by examiner

DISPLAY APPARATUS AND, CONTROL DEVICE, ADSORPTION EQUIPMENT AND CONTROL METHOD THEREOF

CROSS-REFERENCE TO RELATED APPLICATION

This application is a 371 National Stage application of International Application No. PCT/CN2018/096497, filed on Jul. 20, 2018, which has not yet published, and which claims priority to Chinese Patent Application No. 201710861030.5 filed on Sep. 21, 2017 in the State Intellectual Property Office of China, the disclosure of which is hereby incorporated by reference in its entirety.

TECHNICAL FIELD

Embodiments of the present disclosure relate to the field of display technology, and particularly, to a display apparatus and, a control device, an adsorption equipment and a control method thereof.

BACKGROUND

In a flat panel display apparatus, Thin Film Transistor Liquid Crystal Display (TFT-LCD) has the characteristics of small size, low power consumption, relatively low manufacturing cost and radiation-free, and has occupied leading position of the current flat panel display market. OLED (Organic Light-Emitting Diode, OLED for short) display apparatus has been listed as a promising next-generation display technology, because it has the advantages of thin structure, light weight, wide viewing angle, active illumination, continuously adjustable color, low cost, fast response, low power consumption, low driving voltage, wide operating temperature range, simple production process, high luminous efficiency and flexible display.

Usually, in the display apparatus, a housing is connected with the backlight module by means of a clamp connection, a bolt connection or a rivet connection. In actual use, it is usually necessary to disassemble the housing multiple times, such as in secondary rework.

SUMMARY

According to embodiments of an aspect of the present disclosure, there is provided a display apparatus, comprising: a backlight module; a housing having a cavity for receiving the backlight module therein; adsorption device detachably mounted on the housing and configured for removably adsorbing the backlight module on the housing; and a controller configured for controlling the adsorption device to switch between a turn-on state in which the adsorption device generates an adsorption force to adsorb the backlight module to the housing and a turn-off state in which the adsorption device stops the adsorption to remove the backlight module from the housing.

In embodiments of the present disclosure, the housing has a first through hole through which the adsorption device is connected from a side of the housing away from the backlight module to the cavity.

In embodiments of the present disclosure, the display apparatus further comprises a back panel provided between the backlight module and the housing, and the adsorption device is connected in an adsorption manner to the back panel through the first through hole.

In embodiments of the present disclosure, the adsorption device comprises of a magnetic adsorption device and a vacuum adsorption device.

In embodiments of the present disclosure, the housing has a first through hole through which the adsorption device is connected from a side of the housing away from the backlight module to the cavity, and the adsorption device is the magnetic adsorption device comprising: a magnetic adsorption body; and a magnetic field generator in the form of an electromagnet provided in the adsorption body;

wherein, the controller is configured for controlling, in response to an adsorption turn-on command, the magnetic field generator to turn on, and controlling, in response to an adsorption turn-off command, the magnetic field generator to turn off.

In embodiments of the present disclosure, the magnetic field generator comprises: an electrical source; a coil electrically connected with the electrical source; and a core formed of ferromagnetic material and on which the coil is wound.

In embodiments of the present disclosure, the electrical source comprises a storage battery or a lithium battery.

In embodiments of the present disclosure, the adsorption device further comprises a charger configured for charging the electrical source.

In embodiments of the present disclosure, the housing has a first through hole, and, the adsorption device is connected through the first through hole from a side of the housing away from the backlight module to the cavity, and is a vacuum adsorption device comprising: a vacuum adsorption body; and a vacuum extractor, provided in the vacuum adsorption body, and comprising a vacuum chamber and a vacuum pump in communication with the vacuum chamber; wherein, a surface of the adsorption body is provided with a second through hole which is in communication with the vacuum extractor and then in communication with the first through hole; and the controller is configured for controlling, in response to an adsorption turn-on command, the vacuum extractor to turn on, and, controlling, in response to an adsorption turn-off command, the vacuum extractor to turn off.

In embodiments of the present disclosure, the controller comprises: a communication circuit, configured for receiving an adsorption turn-on command and an adsorption turn-off command; and a processor, provided to be electrically connected with the communication circuit, and configured for controlling the adsorption device to switch between the turn-on state and the turn-off state in accordance with the adsorption turn-on command or the adsorption turn-off command.

In embodiments of the present disclosure, the display apparatus further comprises at least two said adsorption devices, and the housing has first through holes provided in a one-to-one correspondence with the at least two said adsorption devices and distributed evenly in the housing.

In embodiments of the present disclosure, the backlight module comprises a CCFL backlight module or an LED backlight module.

According to embodiments of another aspect of the present disclosure, there is also provided a control device, which is applied to the display apparatus of any one of the abovementioned embodiments, and which comprises:

a receiving circuit, configured for receiving an adsorption turn-on command and an adsorption turn-off command; and a controller, configured for controlling the adsorption device to switch between the turn-on state and the turn-off state in accordance with the adsorption turn-on command or the adsorption turn-off command, and comprising:

a communication circuit configured for receiving the adsorption turn-on command and the adsorption turn-off command; and a processor, provided to be electrically connected with the communication circuit, and configured for controlling the adsorption device to switch between the turn-on state and the turn-off state in accordance with the adsorption turn-on command or the adsorption turn-off command.

According to embodiments of a still another aspect of the present disclosure, there is further provided an adsorption equipment, which is applied to the display apparatus of any one of the abovementioned embodiments, and which comprises:

a transmitting circuit, configured for transmitting an adsorption turn-on command and an adsorption turn-off command;

a receiving circuit, configured for receiving the adsorption turn-on command and the adsorption turn-off command; and a controller, configured for controlling the adsorption device to switch between the turn-on state and the turn-off state in accordance with the adsorption turn-on command or the adsorption turn-off command, and comprising:

a communication circuit configured for receiving the adsorption turn-on command and the adsorption turn-off command; and a processor, provided to be electrically connected with the communication circuit, and configured for controlling the adsorption device to switch between the turn-on state and the turn-off state in accordance with the adsorption turn-on command or the adsorption turn-off command.

According to embodiments of a yet another aspect of the present disclosure, there is also further provided a control method, which is applied to the display apparatus of any one of the abovementioned embodiments, and which comprises:

transmitting, by a transmitting circuit, an adsorption turn-on command and an adsorption turn-off command;

receiving, by a receiving circuit, the adsorption turn-on command and the adsorption turn-off command; and controlling, by a controller, the adsorption device to switch between the turn-on state and the turn-off state in accordance with the adsorption turn-on command and the adsorption turn-off command, and this step comprising:

receiving, by a communication circuit, the adsorption command; and controlling, by a processor electrically connected with the communication circuit, the adsorption device to switch between the turn-on state and the turn-off state in accordance with the adsorption turn-on command or the adsorption turn-off command.

DETAILED DESCRIPTION OF THE EMBODIMENTS

In order to simplify the disassembly and assembly steps of a display apparatus, thereby improving the disassembly and assembly work efficiency, and thus improving the product quality of the display apparatus, embodiments of the present disclosure provide a display apparatus, and a control device, an adsorption equipment and a method thereof. The present disclosure will be further described in detail in the following examples for the purpose of making object(s), technical solution(s) and advantage(s) of the present disclosure to be clearer.

In the embodiments of the present disclosure, "front" and "front side" can be understood as a side of the display apparatus that is close to a viewer when the display apparatus is in normal use, and "back side" can be understood as a side of the display apparatus that is away from the viewer. For a typical display apparatus such as a liquid crystal television or a liquid crystal display, because its overall shape is rectangular, a screen of the display apparatus faces the viewer and is perpendicular to the ground or at a certain angle with the ground when the display apparatus is in normal use. Therefore, the "front side" is defined as the side of the display apparatus that is close to the viewer when the display apparatus is in normal use, and the "back side" is the side of the display apparatus away from the viewer when the display apparatus is in normal use.

Figure 1:
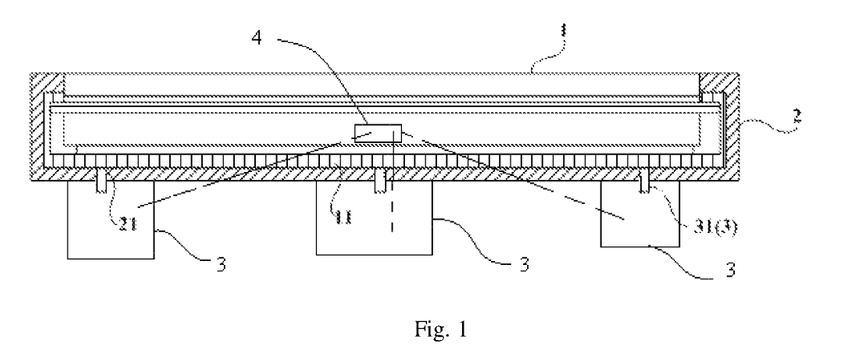
FIG. 1 is a schematic sectional view of a display apparatus according to an embodiment of the present disclosure.

According to overall technical concept of embodiments of the present disclosure, referring to FIG. 1, embodiments of the present disclosure provide a display apparatus. The display apparatus comprises: a backlight module 1, such as one of a CCFL backlight module and an LED backlight module; a housing 2 having a cavity for receiving the backlight module therein, for example the cavity being opened outwardly in figure (e.g., being opened at a top side) to receiving the backlight module 1 that is removably embedded therein; an adsorption device 3 detachably mounted on the housing 2 (e.g., on the other side of the housing 2 that is away from both the outwardly opened side and the backlight module 1) and configured for removably adsorbing the backlight module on the housing (e.g., by means of the generated adsorption force, attaching the backlight module 1 to an inner wall of the cavity defined by the housing 2); and a controller 4, e.g., in the form of a control circuit, configured for controlling the adsorption device 3 to switch between a turn-on state in which the adsorption device generates an adsorption force to adsorb the backlight module to the housing and a turn-off condition in which the adsorption device stops the adsorption to enable removal of the backlight module from the housing. For example, the controller 4 is provided in a position shown schematically in FIG. 1, and is connected with the adsorption device 3 via communication/control link (e.g., in a wired manner or in a wireless manner such as Wifi or Bluetooth, Zigbee, NFC). In an alternative embodiment, the controller 4 can be provided in other position, such as directly inside the adsorption device.

In embodiments of the present disclosure, for example, the adsorption device 3 is electrically connected with the controller 4 (e.g., the electrical connection is shown schematically as broken line in figure).

In embodiments of the present disclosure, for example, the housing 2 has a first through hole 21, and the adsorption device 3 is connected from a side of the housing away from the backlight module to the cavity through the first through hole 21.

The display apparatus according to embodiments of the present disclosure, the other side, opposing to the opened side, of the housing 2 is between the adsorption device 3 and a back panel 11 that is in position within cavity and at the back side of the backlight module 1. That is, the back panel 11 is provided between the backlight module 1 and the housing 2. When the controller 4 receives an adsorption turn-on command, the adsorption device 3 is turned on and generates an adsorption forced exerted on the backlight module 1 to absorb and attach the backlight module 1 to the inner wall of the housing. When the controller 4 receives an adsorption turn-off command, the adsorption device 3 is turned off and the adsorption force disappears so that the backlight module 1 is separated from the inner wall of the housing 2 and thus can be removed from the housing 2. In the display apparatus, the backlight module 1 and the housing 2 are connected by adsorption with each other by means of the adsorption force generated from the adsorption device 3, such adsorption connection specifically is achieved by transmitting an adsorption command to the adsorption device 3 so that the adsorption device 3 is controlled to generate the adsorption force for adsorbing the backlight module 1. Compared with the prior art, it simplifies disassembly and assembly steps of the display apparatus, reduces the wear of the display apparatus in the process of multiple times of disassembly and assembly, obtains high stability, and thereby improves the product quality of the display apparatus and also portability in transportation.

Continue to refer to FIG. 1, in the above embodiments, for example, through the first through hole 21, the adsorption device 3 acts on the back panel 11 on the back side of the backlight module 1, to create an adsorption connection of firmly adsorbing the backlight module 1 to the housing 2 via the back panel 11.

In the embodiments of the present disclosure, the adsorption device 3 comprises at least two (e.g., three in FIG. 1) adsorption devices, and the housing 2 has first through holes 21 provided in a one-to-one correspondence with the adsorption devices 3, and the first through holes 21 are, for example, distributed evenly in the side of the housing 2 away from the backlight module 1. With such structural design, generally the distribution of the adsorption force acting on the back panel 11 is relatively uniform, thereby improving the connection strength between the backlight module 1 and the housing 2.

Figure 2:
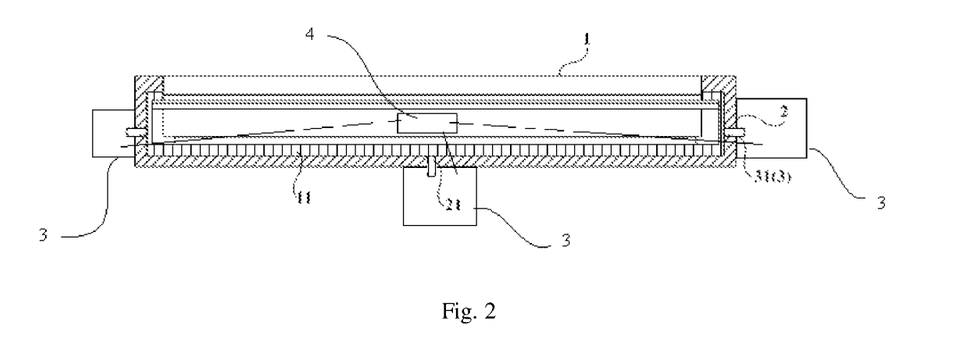
FIG. 2 is a schematic sectional view of a display apparatus according to another embodiment of the present disclosure.

In an alternative embodiment, in the case that the housing, for example, is formed as a cube that is hollow and is opened at one side, the housing has four sides, and correspondingly, both the adsorption devices 3 and the first through holes 21 are, for example, four in number, and the four first through holes 21 are evenly distributed on the four sides of the housing 2. In another alternative embodiment, as shown in FIG. 2, both the adsorption devices 3 and the first through holes 21 are five in number, and the five first through holes 21 are evenly distributed on the four sides (, only two (left and right) sides are shown in FIG. 2 as FIG. 2 is a sectional view) and the back side of housing 2 opposing to the opened side (shown as the top side). Here, electrical connections between the adsorption devices 3 and the controller 4 are shown schematically as broken line in figure.

In the embodiments of the present disclosure, specific type of the adsorption device 3 is not limited, and is, for example, a magnetic adsorption device (more specifically, such as an electromagnet) or a vacuum adsorption device (more specifically, such as a vacuum chamber).

Figure 3:
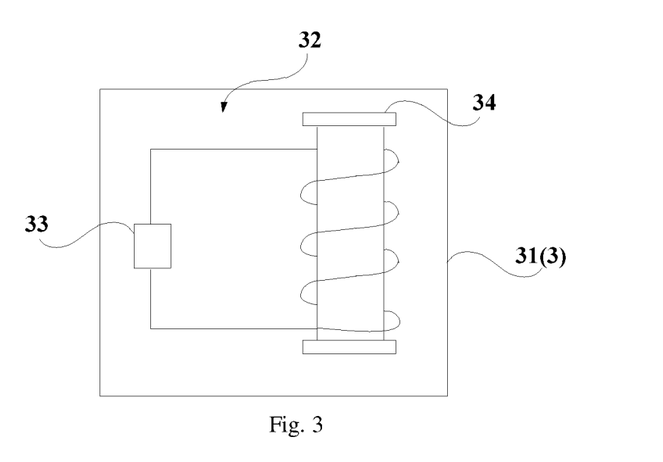
FIG. 3 is a schematic view of an adsorption device according to an embodiment of the present disclosure in the form of a magnetic adsorption device.

As shown in FIG. 3, in an embodiment of the present disclosure, the adsorption device 3 is a magnetic adsorption device, and the absorption device 3 includes an adsorption body 31 and a magnetic field generator 32, for example, in the form of an electromagnet, provided in the adsorption body 31. The controller 4 is electrically connected with the magnetic field generator 32, and the controller 4 is configured for controlling, upon receiving an adsorption turn-on command, the magnetic field generator 32 to turn on, and controlling, upon receiving an adsorption turn-off command, the magnetic field generator 32 to turn off. In other words, the controller is configured for controlling, in response to an adsorption turn-on command, the magnetic field generator 32 to turn on, and controlling, in response to an adsorption turn-off command, the magnetic field generator 32 to turn off.

In an embodiment of the present disclosure, the back panel 11 of the backlight module 1 is of a magnetic material, for example, the back panel 11 is an iron back panel. Thus, when the magnetic field generator 32 is turned on, since the adsorption device 3 is magnetic at this time, the back panel 11 is adsorbed, for example, to the magnetic adsorption device 3. Since the housing 2 is provided between the back panel 11 and the adsorption device 3, the fixed connection of the housing 2 to the backlight module 1 via the back panel 11 is achieved. When the magnetic field generator 32 is turned off, the adsorption device 3 loses its magnetism and cannot continue to adsorb the back panel 11, thereby achieving the separation of the housing 2 from the backlight module 1.

Continue to refer to FIG. 3, in the present embodiment, the magnetic field generator 32, for example, specifically comprises: an electrical source 33, and a coil 34 electrically connected with the electrical source 33 and wound spirally, for example, on a columnar ferromagnetic core. Upon receiving an adsorption turn-on command, the controller controls the electrical source 33 to be electrically connected with the coil 34 to form a current loop. According to the magnetic effect of the current, a magnetic field is generated around the coil 34, for example, causing the core to be magnetized, thereby achieving the adsorption connection of the housing 2 and the backlight module 1. Upon receiving an adsorption turn-off command, the controller controls the loop between the electrical source 33 and the coil 34 to break, the magnetic field disappears, and the core is degaussed accordingly, so that the housing 2 and the backlight module 1 are no longer adsorbed and are separated from each other.

In the embodiments of the present disclosure, specific type of the electrical source 33 is not limited, and is, for example, a storage battery or a lithium battery.

In embodiments of the present disclosure, the adsorption device 3 further includes, for example, a charger for charging the electrical source 33, which facilitates recycling of the electrical source, thereby prolonging the service life of the adsorption device 3. In an embodiment of the present disclosure, the backlight module 1 further includes, for example, a circuit board provided on the back side of the back panel 11, and the charger includes a charging circuit that passes through the first through hole 21 and is respectively connected to the electrical source 33 and the circuit board. The circuit board is a board provided on the back side of the back panel 11, and the charging circuit of the adsorption device 3 is connected to the board.

When the display apparatus is powered on, the charger is connected to the electrical source and charges the electrical source 33. Thus, for example, in the power-on state of the display apparatus, the adsorption device 3 continues to be in a fully charged state. When the display apparatus is in the power-off state, the electrical source 33 starts to work. Since the adsorption device 3 is mainly adsorbed to the back panel formed of the magnetic material so as to adsorb a portion of the housing 2, of which the main material is plastic and which is between the back panel and the adsorption device, the adsorption force required for adsorbing the housing 2 is small. In addition, when a plurality of adsorption devices 3 are used to adsorb the housing 2, each adsorption device 3 needs to provide a small adsorption force, so that each adsorption device 3 has a small power and low power consumption, and therefore, the power supply battery satisfies the adsorption force requirement.

Figure 4:
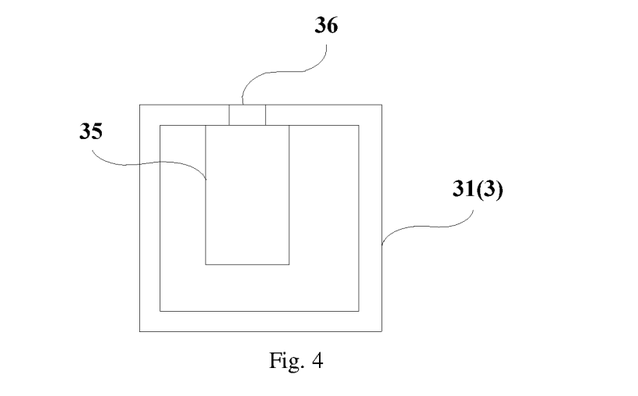
FIG. 4 is a schematic view of an adsorption device according to an embodiment of the present disclosure in the form of a vacuum adsorption device.

Referring to FIG. 4, in another embodiment of the present disclosure, the adsorption device 3 is alternatively or additionally a vacuum adsorption device. The adsorption device 3 comprises: an adsorption body 31; and a vacuum extractor 35 (for example, a vacuum chamber in communication with a vacuum pump) provided in the adsorption body 31. A surface of the adsorption body 31 is provided with a second through hole 36 which is in communication with the vacuum extractor 35 and for example in communication with the corresponding first through hole 21. The controller is electrically connected with the vacuum extractor 35. The controller is configured for controlling, upon receiving an adsorption turn-on command, the vacuum extractor 35 to turn on, and, controlling, upon receiving an adsorption turn-off command, the vacuum extractor 35 to turn off. In other words, the controller is configured for controlling, in response to an adsorption turn-on command, the vacuum extractor 35 to turn on, and, controlling, in response to an adsorption turn-off command, the vacuum extractor 35 to turn off.

In embodiments of the present disclosure, the specific shape of the adsorption body 31 is not limited, and is, for example, a cylinder, a prism, or a truncated cone. The adsorption body 31 is, for example, an iron box in the form of a cylinder. In the present embodiment, more specifically, one of the bottom surfaces (for example, the upper bottom surface) of the adsorption body 31 is an adsorption surface that is coupled by absorption to the back panel 11.

In embodiments of the present disclosure, for example, the backlight module comprises a CCFL backlight module or an LED backlight module.

Figure 5:
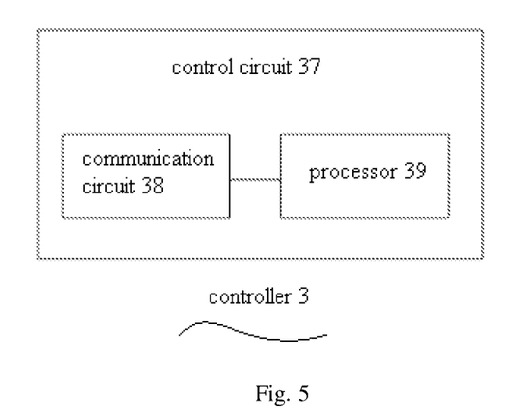
FIG. 5 is a schematic block diagram of a controller according to an embodiment of the present disclosure.

Referring to FIG. 5, in an exemplary embodiment of the present disclosure, the controller 3 for abovementioned adsorption device is shown as a control circuit 37 that includes a communication circuit 38 and a processor 39 electrically connected with the communication circuit 38. The communication circuit 38 is for receiving an adsorption turn-on command and an adsorption turn-off command. The processor 39 is for controlling the adsorption device 3 to switch between the turn-on state and the turn-off state in accordance with the adsorption turn-on command or the adsorption turn-off command. In the present embodiment, the specific type of the communication circuit 38 is not limited, such as a Bluetooth communication circuit or a WIFI communication circuit.

In embodiments of the present disclosure, the adsorption command received by the controller 37 can be transmitted, for example, by a mobile phone APP or other transmitting circuit, and the adsorption command can also be transmitted to the controller 37 by, for example, switching on and off an adsorption switch provided on the adsorption body 31.

In an embodiment of the present disclosure, a mobile phone APP is used to send an adsorption command to the display apparatus. The adsorption command sent by the mobile phone APP is output from a signal transmitting pin of the mobile phone chip, the serial data signal is automatically modulated by the internal hardware of the mobile phone, the high-frequency transmitting circuit inside the mobile phone chip starts to oscillate and transmits a constant-amplitude high-frequency signal. The controller 37 is a decoder chip provided in the adsorption device, the decoder chip checks the address code after receiving the signal, synchronizes the state of the signal transmitting pin, and controls the adsorption device to switch between the turn-on state and the turn-off state.

In any of the above embodiments of the present disclosure, the specific type of the display apparatus is not limited, such as a flat panel display, a flat panel television, a mobile phone, a tablet computer, or an e-book. In addition, the size and number of the adsorption device 3 are set, for example, according to the actual size of the display apparatus or the needs of the customer.

Figure 6:
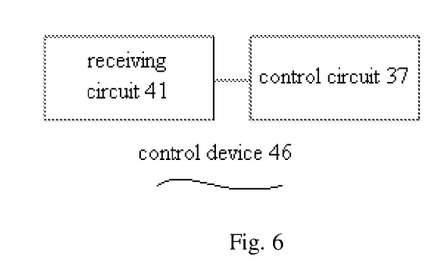
FIG. 6 is a schematic block diagram of a control device for a display apparatus according to an embodiment of the present disclosure.

Referring to FIG. 6, embodiments of the present disclosure also provide a control device 46, which is applied to the display apparatus of any one of the abovementioned embodiments, and comprises:

a receiving circuit 41, configured for receiving an adsorption turn-on command and an adsorption turn-off command; and a controller 37, configured for controlling the adsorption device to switch between the turn-on state and the turn-off state in accordance with the adsorption turn-on command and the adsorption turn-off command.

With the control device of the display apparatus according to the embodiments of the present disclosure, when the receiving circuit 41 of the control device receives the adsorption turn-on command sent to the display apparatus, the controller 37 controls the adsorption device to turn on, and the adsorption device and the backlight module are connected by adsorption; when the receiving circuit 41 of the control device receives the adsorption turn-off command sent to the display apparatus, the controller 37 controls the adsorption device to turn off, and the housing is separated from the backlight module.

For example, the control device is, for example, a terminal such as a mobile phone, and the user sends adsorption turn-on and turn-off commands to the mobile phone terminal. After the mobile phone receives the command, the transmitting chip integrated with a wave oscillator, an encoder and a control circuit defines a certain pin to be used for wireless remote control to transmit signals. Commands are sent to the chip through the mobile phone APP, so that the signal transmitting pin outputs a serial data signal automatically modulated by internal hardware, the high-frequency transmitting circuit inside the chip starts to oscillate, and transmits a constant-amplitude high-frequency signal. The controller 37 of the display apparatus is a decoder chip provided in the adsorption device. The decoder chip checks the address code after receiving the signal, synchronizes the state of the signal transmitting pin, and controls the adsorption device to switch between the turn-on state and the turn-off state.

For example, the control device further includes, e.g., a second communication circuit. Specific type of the second communication circuit is not limited, for example, a Bluetooth communication circuit or a WIFI communication circuit. The second communication circuit is used for performing signal interaction with the communication circuit of the display apparatus, and sending the adsorption turn-on and turn-off commands to the display apparatus.

The control device controls the adsorption device to adsorb the backlight module to the housing, which, compared with the prior art, simplifies disassembly and assembly steps of the display apparatus, reduces the wear of the display apparatus in the process of multiple times of disassembly and assembly, and thereby improves the product quality of the display apparatus.

Figure 7:
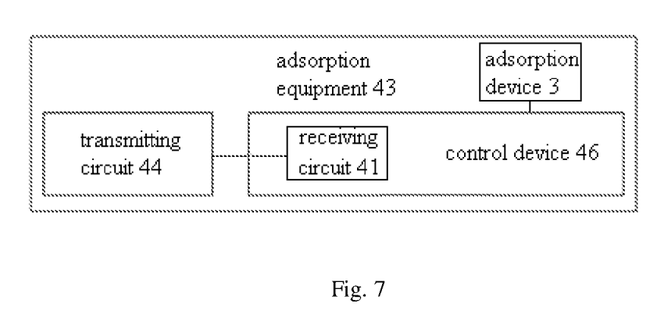
FIG. 7 is a schematic block diagram of an adsorption equipment for a display apparatus according to an embodiment of the present disclosure.

Referring to FIG. 7, embodiments of the present disclosure also provide an adsorption equipment 43, which is applied to the display apparatus of any one of the above-mentioned embodiments, and comprises:

a transmitting circuit 44, configured for transmitting an adsorption turn-on command and an adsorption turn-off command;

a receiving circuit 41, configured for receiving the adsorption turn-on command and the adsorption turn-off command; and a controller 37, configured for controlling the adsorption device to switch between the turn-on state and the turn-off state in accordance with the adsorption turn-on command or the adsorption turn-off command, and comprising:

a communication circuit configured for receiving the adsorption command; and a processor, provided to be electrically connected with the communication circuit, and configured for controlling the adsorption device to switch between the turn-on state and the turn-off state in accordance with the adsorption command.

With the adsorption equipment 43 of the display apparatus according to the embodiments of the present disclosure, when the transmitting circuit 44 sends an adsorption turn-on command to the receiving device 45, the controller controls the adsorption device to turn on, and the adsorption device and the backlight module are connected by adsorption; when the transmitting circuit 44 sends an adsorption turn-off command to the receiving device 45, the control device 46 controls the adsorption device to turn off, and the housing is separated from the backlight module.

In an exemplary embodiment, the equipment has the following specific working process.

First of all, the display apparatus is connected to a mobile phone APP, for example, via Bluetooth. At this time, the adsorption device has no adsorption, and the adsorption device is placed in the through hole. The mobile phone sends an adsorption turn-on command, and the adsorption device starts to work and quickly generates magnetism, to absorb the back panel so as to fix the housing to the back panel. When it is necessary to remove the housing, the mobile phone only needs to send an adsorption turn-off command to the display apparatus via Bluetooth, the adsorption device stops working, the magnetism disappears, and a "one button" disassembly is achieved.

The mobile phone acts as a master device, and the display apparatus acts as a slave device. The master device can implement a "one-to-many" connection. In order to achieve a better identification, the adsorption devices are distinguished, for example, by different colors.

The adsorption equipment 43 controls the adsorption device to adsorb the backlight module to the housing, which, compared with the prior art, simplifies disassembly and assembly steps of the display apparatus, reduces the wear of the display apparatus in the process of multiple times of disassembly and assembly, and thereby improves the product quality of the display apparatus.

With the adsorption equipment of the display apparatus according to the embodiments of the present disclosure, when the transmitting circuit sends an adsorption turn-on command to the receiving device, the control device controls the adsorption device to turn on, and the adsorption device and the backlight module are connected by adsorption; when the transmitting circuit sends an adsorption turn-off command to the receiving device, the control device controls the adsorption device to turn off, and the housing is separated from the backlight module. The adsorption equipment controls the adsorption device to absorb the backlight module to the housing, which, compared with the prior art, simplifies disassembly and assembly steps of the display apparatus, reduces the wear of the display apparatus in the process of multiple times of disassembly and assembly, and thereby improves the product quality of the display apparatus.

Referring also to for example FIG. 7, embodiments of the present disclosure also provide a control method, which is applied to the display apparatus of any one of the above-mentioned embodiments, and comprises:

transmitting, by a transmitting circuit 44, an adsorption turn-on command and an adsorption turn-off command;

receiving, by a receiving circuit 41, the adsorption turn-on command and the adsorption turn-off command; and controlling, by a controller, the adsorption device to switch between the turn-on state and the turn-off state in accordance with the adsorption command, and this step comprising:

receiving, by a communication circuit, the adsorption turn-on command and the adsorption turn-off command; and controlling, by a processor electrically connected with the communication circuit, the adsorption device to switch between the turn-on state and the turn-off state in accordance with the adsorption turn-on command or the adsorption turn-off command.

With the control method of the display apparatus according to the embodiments of the present disclosure, when the transmitting circuit sends an adsorption turn-on command to the receiving device, the control device controls the adsorption device to turn on, and the adsorption device and the backlight module are connected by adsorption; when the transmitting circuit sends an adsorption turn-off command to the receiving device, the control device controls the adsorption device to turn off, and the housing is separated from the backlight module. The adsorption equipment controls the adsorption device to absorb the backlight module to the housing, which, compared with the prior art, simplifies disassembly and assembly steps of the display apparatus, reduces the wear of the display apparatus in the process of multiple times of disassembly and assembly, and thereby improves the product quality of the display apparatus.

Apparently, those skilled in the art can make various changes and modifications to the embodiments of the present disclosure without departing from the spirit and scope of the embodiments of the present disclosure. Thus, the present disclosure is intended to cover such changes and modifications if they fall within the scope of the present disclosure defined by the claims and its equivalents.

What is claimed is:
1. A display apparatus, comprising:
a backlight module;
a housing having a cavity for receiving the backlight module therein;

at least two adsorption devices detachably mounted on the housing and configured for removably adsorbing the backlight module on the housing;
a controller configured for controlling the adsorption devices to switch between a turn-on state in which the adsorption devices generate an adsorption force to adsorb the backlight module to the housing and a turn-off state in which the adsorption device stops devices stop the adsorption to remove the backlight module from the housing;
wherein the housing comprises first through holes provided in a one-to-one correspondence with the at least two adsorption devices.

2. The display apparatus of claim 1, wherein, the adsorption devices comprise at least one of a magnetic adsorption device or a vacuum adsorption device.

3. The display apparatus of claim 2, wherein, the adsorption devices are connected from a side of the housing away from the backlight module to the cavity through the first through holes, and the adsorption devices are magnetic adsorption devices comprising:
a magnetic adsorption body; and
a magnetic field generator in the form of an electromagnet provided in the magnetic adsorption body;
wherein, the controller is configured for controlling, in response to an adsorption turn-on command, the magnetic field generator to turn on, and controlling, in response to an adsorption turn-off command, the magnetic field generator to turn off.

4. The display apparatus of claim 3, wherein, the magnetic field generator comprises:
an electrical source;
a coil electrically connected with the electrical source; and
a core formed of ferromagnetic material and on which the coil is wound.

5. The display apparatus of claim 4, wherein, the electrical source comprises a storage battery or a lithium battery.

6. The display apparatus of claim 4, wherein, the adsorption devices further comprise a charger configured for charging the electrical source.

7. The display apparatus of claim 2, wherein, the adsorption devices are connected through the first through holes from a side of the housing away from the backlight module to the cavity, and the adsorption devices are vacuum adsorption devices comprising:
a vacuum adsorption body; and
a vacuum extractor, provided in the vacuum adsorption body, and comprising a vacuum chamber and a vacuum pump in communication with the vacuum chamber;
wherein, a surface of the vacuum adsorption body is provided with a second through hole which is in communication with the vacuum extractor and then in communication with the first through hole; and
the controller is configured for controlling, in response to an adsorption turn-on command, the vacuum extractor to turn on, and, controlling, in response to an adsorption turn-off command, the vacuum extractor to turn off.

8. The display apparatus of claim 1, wherein,
devices are connected from a side of the housing away from the backlight module to the cavity through the first through holes.

9. The display apparatus of claim 8, further comprising a back panel provided between the backlight module and the housing, wherein adsorption devices are connected in an adsorption manner to the back panel through the first through holes.

10. The display apparatus of claim 1, wherein, the controller comprises:
a communication circuit, configured for receiving an adsorption turn-on command and an adsorption turn-off command; and
a processor, provided to be electrically connected with the communication circuit, and configured for controlling the adsorption devices to switch between the turn-on state and the turn-off state in accordance with the adsorption turn-on command or the adsorption turn-off command.

11. The display apparatus of claim 1, wherein the first through holes are distributed evenly in the housing.

12. The display apparatus of claim 1, wherein, the backlight module comprises a CCFL backlight module or an LED backlight module.

13. A control device, which is applied to the display apparatus of claim 1, comprising:
a receiving circuit, configured for receiving an adsorption turn-on command and an adsorption turn-off command; and
a controller, configured for controlling the adsorption devices to switch between the turn-on state and the turn-off state in accordance with the adsorption turn-on command or the adsorption turn-off command, and comprising:
a communication circuit configured for receiving the adsorption turn-on command and the adsorption turn-off command; and
a processor, provided to be electrically connected with the communication circuit, and configured for controlling the adsorption devices to switch between the turn-on state and the turn-off state in accordance with the adsorption turn-on command or the adsorption turn-off command.

14. An adsorption equipment, which is applied to the display apparatus of claim 1, comprising:
a transmitting circuit, configured for transmitting an adsorption turn-on command and an adsorption turn-off command;
a receiving circuit, configured for receiving the adsorption turn-on command and the adsorption turn off command; and
a controller, configured for controlling the adsorption devices to switch between the turn-on state and the turn-off state in accordance with the adsorption turn-on command or the adsorption turn-off command, and comprising:
a communication circuit configured for receiving the adsorption turn-on command and the adsorption turn-off command; and
a processor, provided to be electrically connected with the communication circuit, and configured for controlling the adsorption devices to switch between the turn-on state and the turn-off state in accordance with the adsorption turn-on command or the adsorption turn-off command.

15. A control method, which is applied to the display apparatus of claim 1, comprising:
transmitting, by a transmitting circuit, an adsorption turn-on command and an adsorption turn-off command;
receiving, by a receiving circuit, the adsorption turn-on command and the adsorption turn-off command; and
controlling, by a controller, the adsorption devices to switch between the turn-on state and the turn-off state in accordance with the adsorption turn-on command or the adsorption turn-off command, and the step comprising:
receiving, by a communication circuit, the adsorption turn-on command and the adsorption turn-off command; and
controlling, by a processor electrically connected with the communication circuit, the adsorption devices to switch between the turn-on state and the turn-off state in accordance with the adsorption turn-on command or the adsorption turn-off command.

\* \* \* \* \*